Patented June 30, 1942

2,287,773

UNITED STATES PATENT OFFICE 2,287,773

RUBBERLIKE MATERIALS

Reginald George Robert Bacon, William Baird, Bernard James Habgood, and Leslie Budworth Morgan, Blackley, Manchester, England, assignors to Imperial Chemical Industries Limited, a corporation of Great Britain No Drawing. Application February 28, 1940, Serial No. 321,350. In Great Britain March 3, 1939

6 Claims. (Cl. 260—768)

This invention relates to the modification of natural rubber to improve its resistance to oils and solvents.

It is well known that natural rubber, or more shortly rubber, easily absorbs oil and solvents. This property of rubber is, except when rubber solutions are required, nearly always a disadvantage. Certain synthetic rubber-like materials made in recent years, notably that made by the polymerisation of 2-chlorobutadiene-1:3 and those made by polymerising mixtures of butadiene-1:3 and certain other unsaturated compounds, have much higher resistance to oils and solvents than has rubber. These synthetic materials are therefore, as far as properties are concerned, adapted for uses for which rubber is unsuitable or impossible. They are, however, much more expensive to obtain than is rubber, and this prevents their being used for many purposes for which they are otherwise better adapted than rubber.

The object of the present invention is to produce an inexpensive rubber-like material which will have a higher resistance to oils and solvents than rubber. We have found that this can be done by a process of modifying rubber in which dithiocyanogen is used. We have found that dithiocyanogen reacts readily with rubber in certain proportions to produce rubber-like materials with the desired higher resistance to oils and solvents. The extent of the modification in properties depends to a large extent upon the proportions of dithiocyanogen interacting with the rubber. A noticeable improvement in oil and solvent resistance is obtained when the rubber is treated with dithiocyanogen in quantity such that there becomes chemically combined about 5% of that which would be chemically combined if there were complete saturation, that is to say, if all the free ethylenic linkages became saturated. When the dithiocyanogen is used in quantities to give a saturation of 15–25%, instead of the 5% just mentioned, products are obtained having oil and solvent resistance equal to or nearly equal to the best of the synthetic rubber-like materials. With a saturation above about 30–35% the rubber-like properties as judged by the unvulcanised and ordinarily vulcanised products begin to decline; the rubber-like properties as judged by suitability for the production of ebonite by vulcanising in the presence of higher proportions of sulphur than are used in ordinary vulcanisations still remain up to a saturation of about 50%. The formation of ebonites is in fact an important part of the invention. Products with a saturation above 50% are not included in the invention. The process of making the modified rubbers is not confined to a process where dithiocyanogen alone is used. Small proportions of dithiocyanogen can be replaced by other substances which react with rubber, e. g. halogens, hydrohalides and thiocyanogen derivatives. The use of such substances is not necessary for the production of modified rubber-like substances having the high resistance to oils and solvents mentioned above, but such use will result in products having slightly different properties. Where other substances are used they may be brought into interaction with the rubber at any convenient stage, for instance before the treatment with the dithiocyanogen, for instance for the purpose of reducing the viscosity of the rubber.

The rubber-like products obtained by the treatment with dithiocyanogen are in general tough resilient products having the high oil and solvent resistance mentioned above. The uncured products are suitable for use as oil-resisting pigment-bearing diluents in synthetic rubber-like material.

Vulcanisation takes place to a slight extent if the rubber-like products are heated without the addition of any vulcanising agents. Further vulcanisation can be effected by adding a vulcanisation accelerator and then heating. More efficient vulcanisation takes place when both a vulcanisation accelerator and sulphur or a suitable sulphur-yielding compound are used. The vulcanisation accelerators react with the rubber-like products as they do with natural rubber. Softeners, plasticisers and peptisers may be used along with the rubber-like materials and also reinforcing ingredients and fillers. The products of this invention may be used alone or in admixture with rubber or synthetic rubber-like materials.

Valuable ebonite-like products may be obtained by vulcanising in the presence of high proportions of sulphur, e. g. 30% of the weight of the rubber-like material.

The invention accordingly includes a process for the manufacture of modified rubber-like materials having improved resistance to oils and solvents, as compared with rubber, which comprises treating rubber with dithiocyanogen with or without minor proportions of other reactive substances, the dithiocyanogen being in quantity such that there becomes chemically combined with the rubber not more than 50% of that which would be chemically combined if there were complete saturation.

The invention also includes the process of vulcanising the rubber-like materials obtained by the aforesaid process, and also the products of the two processes.

The treatment with dithiocyanogen is carried out conveniently in a liquid which dissolves the rubber or at least causes it to swell, and the dithiocyanogen is conveniently brought into reaction in the form of a solution in the same liquid or in another liquid such that the solutions are readily miscible.

Since polymerisation readily takes place in dithiocyanogen solutions, the solution should be used when freshly prepared or after keeping under conditions where little or no polymerisation takes place, e. g. cold, in the dark and with the dithiocyanogen at low concentration in the solution.

In a convenient way of carrying the invention into practical effect, the rubber is dissolved in a suitable solvent and stirred, while the dithiocyanogen, which is also in solution, is stirred in so as to obtain a homogeneous mixture. Reaction is rapid and in some cases incomplete at the end of an hour. The solvent is then removed, for instance by drying in a vacuum oven. Light and air should be excluded during manufacture as much as is conveniently possible.

Inexpensive easily-recoverable organic solvents, which do not interact with dithiocyanogen or rubber under the conditions used, e. g. benzene and carbon tetrachloride, should be used.

The invention is illustrated but not limited, by the following examples, in which the quantities are given in parts by weight.

Example 1

350 parts of a freshly prepared solution of 17½ parts of dithiocyanogen in 332½ parts of benzene, are added with agitation at about 15° C. to a solution of 100 parts of masticated rubber in 790 parts of benzene. The mixture is then left to stand. In about half an hour it has set to a gel and has developed a deep red colour. The benzene is then removed by heating the mass at 50° C. under subatmospheric pressure (e. g. at 100 mm.) in a vacuum oven.

There is thus obtained a strong, elastic, rubber-like mass which is free of solvent. This is worked into sheet form on a warm roller mill. 118 parts of product are obtained. This on analysis is found to contain 3.65% of nitrogen; this corresponds with an absorption of 0.104 molecule of dithiocyanogen for each ethylenic linkage in the original rubber.

A similar product, having slightly greater extensibility, is obtained if there is used, in addition to the dithiocyanogen, 2½ parts of ethyl mercaptan.

Example 2

100 parts of masticated rubber are dissolved in 790 parts of benzene and 1000 parts of a freshly prepared solution consisting of 50 parts of dithiocyanogen in 950 parts of benzene are added. The mixed solutions quickly set to a stiff, deep red gel, from which after removal of benzene as described in Example 1 and milling, 147 parts of product are obtained in the form of a resilient rubbery sheet which is tougher than that described in Example 1.

This substance contains 7.4% nitrogen, corresponding with an absorption of 0.258 molecule of dithiocyanogen for each ethylenic linkage of the original rubber.

Example 3

The product of Example 1 was mixed on a roller mill by the usual technique, with vulcanising ingredients according to the following recipe:

|  | Parts |
|---|---|
| Product of Example 1 | 100 |
| Light calcined magnesia | 10 |
| Stearic acid | 2 |
| Pine tar | 4 |
| Channel black | 40 |
| Sulphur | 3 |
| Mercaptobenzthiazole | 0.75 |

The compounding was found to be not quite so readily carried out as that of a corresponding mixing from natural rubber as the new product is less plastic.

The compounded mixture was vulcanised for 1 hour at 141° C. and there was thus obtained resilient rubber-like material having the following physical properties, determined in the usual way.

| | |
|---|---|
| Tensile strength kg./sq. cm. | 139 |
| Elongation at break per cent. | 273 |
| Resilience | 53.5 |
| Hardness | 69 |

Resilience was measured on an instrument as described by Barnett & Matthews, Ind. & Eng. Chem., 1934, 26, 1292, and the hardness by a "Shore durometer." The resilience is expressed as a percentage energy return.

After immersion in Diesel oil at 70° C. for 7 days a sample of the material was much less affected than a sample of a vulcanisate from a corresponding mixing made from natural rubber.

Example 4

The product of Example 2 was compounded and vulcanised as described in Example 3 and the vulcanisate similarly tested, in comparison with the vulcanised rubber. The following table shows the effect of immersion in benzene and Diesel oil of discs of vulcanisates 44.7 mm. diameter and 4.0 mm. thick, i. e. of original volume 6.3 cc. In the table the volumes are expressed as percentages of the original volume.

| | Volume after immersion in— | |
|---|---|---|
| | Benzene at 20° C. 2 days | Diesel oil at 70° C. 7 days |
| Untreated rubber | 300 | 480 |
| Product of Example 4 | 70 | 27 |

Example 5

1000 parts of pale crepe rubber are masticated on a roller mill with the addition of 1% of thio-β-naphthol to assist plasticising, and when the rubber is in a soft plastic condition it is made into sheets. The sheeted material is transferred to a water-cooled internal mixer and then, while it is being mechanically agitated, a freshly prepared solution of 256 parts of dithiocyanogen in 1440 parts of benzene is gradually added. A dark-red gel is first produced and then as reaction proceeds this gel stiffens to a sticky, elastic spongy mass. Agitation is continued for another hour. The benzene is then removed from the mass and the product sheeted, as in Example 1.

Example 6

100 parts of the product of Example 2 are milled with 50 parts of dibutyl thiodiglycollate. This makes the product plastic enough to be readily workable. It is then mixed with the same ingredients as in Example 3, using also the same quantities, and the mixture vulcanised for 30 minutes at 141° C.

The product is a rubber-like material, with a resilience of 64.1%. Upon immersion in benzene for 7 days at 20° C. the volume increase is only 112% of the original volume, and on immersion in Diesel oil for 7 days at 70° C., the increase is only 28%. A similarly compounded and vulcanised natural rubber showed increases of 450% and 360% respectively, when similarly immersed.

Example 7

100 parts of masticated pale crepe rubber, are dissolved in 800 parts of benzene, 50 parts of dibutyl thiodiglycollate are added followed by a solution of 34 parts of dithiocyanogen in 500 parts of benzene. The resulting mixture is stirred at 20° C., until stiffening has taken place and then allowed to stand for 20 hours. The benzene is then removed from the mass and the product sheeted as in Example 1. The product is a strong but soft and elastic rubber-like material which may be worked readily on a roller mill. After compounding and vulcanising as in Example 3, a vulcanisate is obtained having a resilience of 63.8% and which gives an increase in volume of 100% when immersed in benzene for 2 days at 20° C. and of 25% in mineral oil for 7 days at 70° C.

Example 8

A solution of 100 parts of masticated pale crepe rubber in 800 parts of benzene is heated with 10 parts of thioglycollic acid at 70° C. until a very mobile solution is obtained. Owing to the decreased viscosity of the solution, it may more readily be mixed with dithiocyanogen solution, and after reaction it yields a gel of greater plasticity than rubber untreated with thioglycollic acid would yield. A product made in this way, using 0.15 mol. dithiocyanogen per ethylenic bond of the rubber, after compounding according to the recipe given in Example 3, and vulcanising for 1 hour at 141° C. gives a rubbery vulcanisate having a tensile strength of 235 kg./sq. cm. which gives an increase in volume of 95% after 7 days in benzene at 20° C. and 57% after 7 days in Diesel oil at 70° C.

Instead of thioglycollic acid, other reagents may be used to lower the viscosity of rubber solutions prior to addition of thiocyanogen. They are normally used in small proportions, e. g. 1 to 10 parts per 100 parts of rubber. Examples of such reagents are p-toluenesulphinic acid, phenylhydrazine and trichloracetic acid.

Example 9

The product of Example 2 was mixed on a roller mill by the usual technique, with vulcanising ingredients, according to the following recipe:

| | Parts |
|---|---|
| Product of Example 2 | 100 |
| Sulphur | 30 |
| Diphenylguanidine | 1 |
| Light calcined magnesia | 2 |
| Dibutyl phthalate | 10 |

The compounded mixture was vulcanised for 3½ hours at 141° C. A vulcanisate was obtained resembling an ebonite and highly resistant to oils and solvents.

Example 10

Modified rubber can also be used as a diluent for natural and synthetic rubber. The following mixing

| | Parts by weight |
|---|---|
| Neoprene (synthetic rubber-like material produced by the partial polymerisation of 2-chlorobutadiene-1:3) | 100 |
| Light calcined magnesia | 10 |
| Wood resin | 5 |
| Zinc oxide | 5 |
| Product of Example 2 | 50 |
| Sulphur | 1.25 |
| Mercaptobenzthiazole | 0.25 | after vulcanisation for 1 hour at 141° C. gives a swelling in benzene of only about 50% of that obtained with a similar mixing containing no modified rubber.

We claim:

1. Process for the manufacture of rubber-like materials, having higher resistance to oils and solvents than natural rubber, which comprises dissolving natural rubber in a solvent therefor, dissolving dithiocyanogen in a solvent therefor which is miscible with the rubber solvent, and reacting the natural rubber with from about 5 per cent to about 50 per cent of the amount of dithiocyanogen necessary to completely saturate the natural rubber by mixing the reactants in solution.

2. Process for the manufacture of rubber-like materials, having higher resistance to oils and solvents than natural rubber, which comprises dissolving natural rubber in a solvent therefor, dissolving dithiocyanogen in a solvent therefor which is miscible with the rubber solvent, and reacting the natural rubber with from about 15 per cent to about 25 per cent of the amount of dithiocyanogen necessary to completely saturate the natural rubber by mixing the reactants in solution.

3. A rubber-like material comprising natural rubber having, in chemical combination therewith, from about 5 per cent to about 50 per cent of the amount of dithiocyanogen necessary to completely saturate the natural rubber.

4. A rubber-like material comprising natural rubber having, in chemical combination therewith, from about 15 per cent to about 25 per cent of the amount of dithiocyanogen necessary to completely saturate the natural rubber.

5. A vulcanized rubber-like material comprising natural rubber having in chemical combination therewith from about 5 per cent to about 50 per cent of the amount of dithiocyanogen necessary to completely saturate the natural rubber.

6. A vulcanized rubber-like material comprising natural rubber having in chemical combination therewith from about 15 per cent to about 25 per cent of the amount of dithiocyanogen necessary to completely saturate the natural rubber.

REGINALD GEORGE ROBERT BACON.
WILLIAM BAIRD.
BERNARD JAMES HABGOOD.
LESLIE BUDWORTH MORGAN.